June 11, 1963 C. HOROWITZ 3,093,153
QUICK RELEASE VALVE
Filed Sept. 14, 1961

INVENTOR.
Charles Horowitz,
BY Parker & Carter
Attorneys.

United States Patent Office 3,093,153
Patented June 11, 1963

3,093,153
QUICK RELEASE VALVE
Charles Horowitz, Chicago, Ill., assignor to Berg Airlectro Products Co., Chicago, Ill., a corporation of Illinois
Filed Sept. 14, 1961, Ser. No. 138,071
2 Claims. (Cl. 137—102)

This invention relates to valves and has particular relation to a quick release valve.

One purpose of the invention is to provide a valve of minimum parts and maximum economy and ease of manufacture.

Another purpose is to provide a quick release valve having movable parts capable of maximum service duration and positive action.

Another purpose is to provide a movable valve member of maximum simplicity in construction and reliability in use.

Another purpose is to provide a quick release valve wherein the advantages of a movable valve member formed of resilient material and the advantages of the maintenance of certain rigidity factors are both achieved.

Another purpose is to provide a quick release valve which shall be productive of a minimum pressure loss.

Another purpose is to provide a quick release valve of maximum speed in the application of pressure therethrough.

Another purpose is to provide a valve of maximum speed in the release of pressure.

Another purpose is to provide a quick release valve which shall be effective to direct fluid under pressure to the brake systems of a tractor-trailer vehicle, for example, and to release the pressure in the brake chambers of said vehicle.

Another purpose is to provide a quick release valve of the type described which shall be rapidly and positively effective without the employment of yielding means such as springs and the like.

Other purposes will appear from time to time during the course of the specification and claims.

Figure 1:
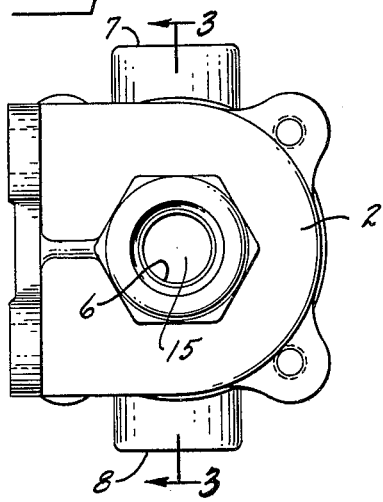
Figure 2:
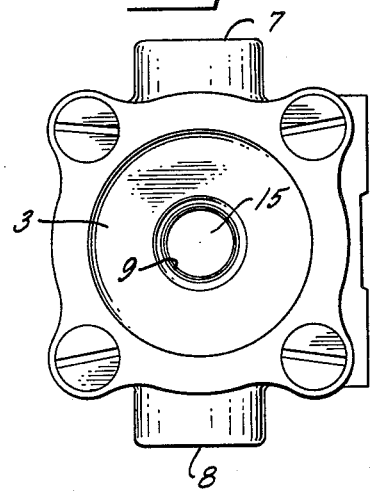
Figure 4:
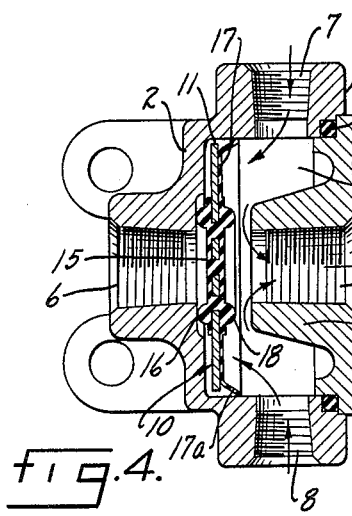
Figure 3:
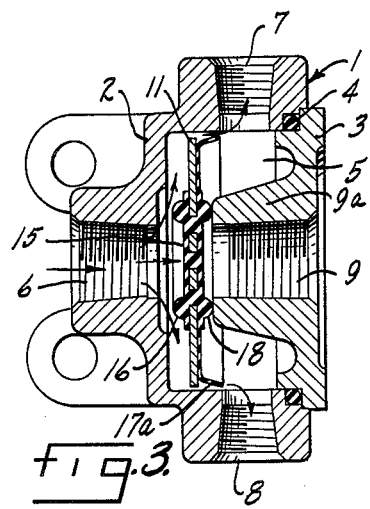
Figure 5:
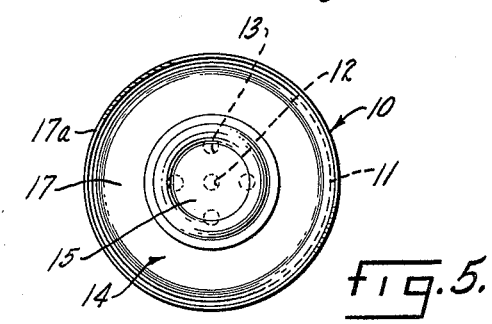

I illustrate my invention more or less diagrammatically in the accompanying drawings, wherein:

FIGURE 1 is an end view;
FIGURE 2 is another end view;
FIGURE 3 is a side view in partial cross section illustrating the valve of the invention with parts in one position;
FIGURE 4 is a side view in partial cross section illustrating the valve of the invention with parts in another position; and
FIGURE 5 is a detail view illustrating a movable member of the valve of the invention.

Like parts are indicated by like numerals throughout the specification and drawings.

Referring now to the drawings, and particularly to FIGURES 3 and 4 thereof, the numeral 1 generally designates a valve housing. The housing 1 is formed of a body member 2 and a cover member 3, a seal 4 being provided between the members 2, 3 to preclude the escape of fluid pressure therebetween.

A valve chamber 5 is formed in housing 1. A fluid pressure inlet 6 is formed in housing 1 and communicates with chamber 5 at one end thereof. A pair of fluid pressure outlets 7, 8 is formed in housing 1 and communicate with chamber 5 intermediate the ends thereof. A fluid pressure outlet 9 is formed in housing 1 and communicates with chamber 5 at a point opposite that at which inlet 6 communicates with chamber 5.

Reciprocally mounted within chamber 5 is a valve shuttle member 10. The member 10 includes a metallic disc 11. As best seen in FIGURE 4 in dotted lines, the disc 11 has a central or axial aperture 12 therein and a plurality of circumferentially spaced apertures 13 paralleling the aperture 12 and surrounding the same in adjacent relationship.

A seal member 14 is molded upon the disc 11 and is both adhesively and mechanically secured thereto. The seal element 14 has a central disc-like portion 15 lying against and molded upon the central annular portion of that surface of disc 11 opposed to inlet 6. An annular inlet seal ridge 16 is upstanding from portion 15 and is of greater diameter than the inlet 6 whereby the ridge 16 seats upon an annular portion of the wall of chamber 5 which is penetrated by inlet 6.

The member 14 has an opposite annular portion 17 which is molded upon and against the opposite surface of disc 11. A valve seat or ridge 18 is upstanding from the surface 17 for sealing engagement about the outlet 9 when the member 10 is at one position to seal the outlet 9 against the escape of fluid pressure therethrough. It will be observed that the material of member 14, which has the properties of rubber, for example, in the process of molding is caused to flow through and fill the apertures 12, 13 to join the segments 15, 17 integrally and to mechanically lock the member 14 to the member 11.

The portion 17 of member 14 has an outer diameter greater than the inner diameter of chamber 5 and greater than the outer diameter of disc 11. The member 17 is of relatively thin material and the peripheral annular portion 17a beyond the disc 11 thus forms a flexible lip engaging the wall of chamber 5 between the inlet 6 and the outlets 7, 8. Thus, the diameter of portion 17 is greater than the inner diameter of chamber 5 to provide for such engagement of the lip 17a with the wall of chamber 5 and chamber 5 is of greater diameter than disc 11 whereby an annular air passage space is provided about the periphery of disc 11 and between it and the wall of chamber 5.

The use and operation of the invention are as follows:

The inlet 6 may be connected, for example, to the fluid pressure supply line of a fluid pressure operated brake system employed with tractor-trailer combination vehicles. Upon the delivery of fluid under pressure to inlet 6, the member 10 against which said fluid pressure impinges is caused to move immediately toward the inwardly extending abutment 9a which surrounds and defines the outlet passage 9. The application of merely fractional amounts of fluid pressure above atmospheric at inlet 6, because of the area involved and the light weight of member 10, is effective to move the member 10 toward outlet 9. Similarly, the distance between inlet 6 and outlet 9 is maintained at a minimum, as may be best seen in FIGURES 3 and 4. While, for convenience, the outlets 7, 8 have been defined as being intermediate the ends of chamber 5, and inlet 6 and outlet 9 have been described as at the opposite ends of chamber 5, it will be realized that the outlets 7, 8 are positioned beyond the inner end of abutment 9a which extends into chamber 5 to provide for seating of valve seat or ridge 18 upon the inner annular end of abutment 9a substantially simultaneously with the delivery of pressure to surface 15 of member 14.

The pressure entering housing 1 through inlet 6 is free to and does flow about the periphery of disc 11 and between said periphery and the inner wall of chamber 5 from whence it is effective to move the inclined lip 17a further in the direction in which it is inclined to separate it from contact with the wall of chamber 5 and to permit the continued flow of fluid pressure from inlet 6 into chamber 5 and thereafter outwardly through outlets 7, 8 to, for example, the brake chambers of the vehicle.

Upon release, by the vehicle operator for example, of the delivery of service fluid pressure at inlet 6 and substantially immediately upon the diminution of such delivered fluid pressure to an amount less than that present in the brake chambers and brake chamber system of the vehicle which is connected to outlets 7 and 8, the resulting pressure differential is immediately effective, as represented by the arrows in FIGURE 4, to move the member 10 back toward inlet 6 and to cause the ridge 16 to seat about the inlet 6. At the same time, the said excess pressure filling and entering chamber 5 from the brake chamber system of the vehicle, operates against the lip 17a to urge it outwardly against and in sealing contact with the inner wall of chamber 5. Thus, the lip 17a acts as an effective check valve, permitting the flow of fluid pressure from inlet 6 to outlets 7 and 8, and preventing the reverse flow of fluid pressure from passages 7, 8 to inlet 6.

Upon movement of member 10 away from outlet 9 and the consequent unseating of ridge 18a from engagement with the annular inner end surface of abutment 9a surrounding outlet 9, the outlet 9, which may serve in such a vehicle system as an exhaust outlet, is placed in communication through chamber 5 with outlet passages 7, 8 and the excess of fluid pressure present in chamber 5 and entering said chamber from the brake chamber system is thus rapidly exhausted through outlet 9 to atmosphere, and the valve is positioned for repeated application of service pressure through inlet 6 when desired.

Whereas I have described and claimed a preferred embodiment of the invention, it will be understood that further modifications will suggest themselves to those skilled in the art upon a reading of the foregoing specification. Accordingly, the foregoing description should be taken as merely illustrative and not definitive, and the scope of the invention should be limited only by the following appended claims.

I claim:

1. A quick release valve assembly comprising a housing, a chamber in said housing, an inlet in said housing, an outlet in said housing, a second outlet in said housing intermediate said inlet and said first-named outlet, a shuttle valve member movable between said inlet and said first-named outlet in response to pressure within said chamber, said shuttle valve member comprising a metal disc having a diameter slightly less than the inner diameter of said chamber, a seal element having a central portion secured to said disc and having circular ridges extending in opposite axial directions about the center of said disc for sealing contact with said inlet in said first-named outlet, said seal element having a major annular portion lying on that side of said disc opposite from the side opposed to said inlet, said seal element annular portion having a diameter greater than the inner diameter of said chamber whereby a portion of said seal element annular portion is folded upon itself by contact with the inner wall of said chamber to form a peripheral lip portion, said seal element annular portion and said seal element lip portion having a thickness less than that of said disc, said seal element and disc being joined only adjacent the central areas thereof.

2. A valve comprising a housing, a chamber in said housing, a fluid pressure inlet at one end of said chamber, a fluid pressure outlet formed in the opposite end of said chamber, a second fluid pressure outlet communicating with said chamber, a valve shuttle member reciprocally mounted in said chamber, said shuttle member comprising a metallic disc, a rubber-like seal element molded upon and mechanically locked with a central area of said disc, said seal element having a seal ridge extending axially beyond one surface of said disc and positioned to contact a surface of said chamber surrounding said inlet to seal the same, said seal element having a thin, annular portion in contact with the opposite surface of said disc and having a diameter larger than said chamber whereby a peripheral lip portion is formed in contact with the inner wall of said chamber, the diameter of said disc being less than the diameter of said chamber whereby an annular fluid pressure passage is formed about the periphery of said disc and between said disc periphery and the inner wall of said chamber, said annular seal element portion and lip having a thickness less than that of said disc, said second outlet being positioned beyond one end of the path of movement of said disc from said inlet, a second seal ridge extending axially beyond said last-named surface of said disc for sealing engagement with and about said first outlet to seal the same against the escape of fluid pressure therethrough, said seal element lip portion being inclined away from said disc and toward said second outlet whereby fluid pressure passing from said inlet about said periphery of said disc is permitted to move said lip portion away from contact with said chamber wall and to pass therebetween for delivery to said second outlet and fluid pressure attempting to move in the opposite direction about said periphery of said disc causes a movement of said lip into sealing engagement with the wall of said chamber to prevent the flow of fluid pressure therebetween.

References Cited in the file of this patent

UNITED STATES PATENTS

| | | |
|---|---|---|
| 1,506,012 | Lewis | Aug. 26, 1924 |
| 2,567,391 | Mead | Sept. 11, 1951 |
| 2,985,423 | Tischler et al. | May 23, 1961 |

FOREIGN PATENTS

| | | |
|---|---|---|
| 1,098,589 | France | Mar. 9, 1955 |